US006507904B1

(12) United States Patent
Ellison et al.

(10) Patent No.: US 6,507,904 B1
(45) Date of Patent: Jan. 14, 2003

(54) EXECUTING ISOLATED MODE INSTRUCTIONS IN A SECURE SYSTEM RUNNING IN PRIVILEGE RINGS

(75) Inventors: Carl M. Ellison, Portland; Roger A. Golliver, Beaverton, both of OR (US); Howard C. Herbert, Phoenix, AZ (US); Derrick C. Lin, Foster City, CA (US); Francis X. McKeen; Gilbert Neiger, both of Portland, OR (US); Ken Reneris, Wilbraham, MA (US); James A. Sutton, Portland, OR (US); Shreekant S. Thakkar, Portland, OR (US); Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,477

(22) Filed: Mar. 31, 2000

(51) Int. Cl.$^7$ .................................................. G06F 9/44
(52) U.S. Cl. ........................ 712/229; 711/152; 709/100
(58) Field of Search .......................... 712/229; 713/164, 713/166; 711/152; 709/100

(56) References Cited

U.S. PATENT DOCUMENTS

| | | | |
|---|---|---|---|
| 4,037,214 A | 7/1977 | Birney et al. | 711/216 |
| 4,278,837 A | 7/1981 | Best | 713/190 |
| 4,366,537 A | 12/1982 | Heller et al. | 711/164 |
| 4,521,852 A | 6/1985 | Guttag | 711/163 |
| 5,022,077 A | 6/1991 | Bealkowski et al. | 711/163 |
| 5,075,842 A | 12/1991 | Lai | 711/152 |
| 5,255,379 A | * 10/1993 | Melo | 711/202 |
| 5,293,424 A | 3/1994 | Holtey et al. | 713/193 |
| 5,421,006 A | 5/1995 | Jablon et al. | 714/36 |
| 5,459,869 A | 10/1995 | Spilo | 709/324 |
| 5,473,692 A | 12/1995 | Davis | 705/59 |

(List continued on next page.)

FOREIGN PATENT DOCUMENTS

| | | |
|---|---|---|
| EP | 0600112 | 8/1994 |
| EP | 0930567 A | 7/1999 |
| EP | 1146715 | 10/2001 |
| WO | WO 9834365 A | 8/1998 |
| WO | WO9844402 | 10/1998 |
| WO | WO9905600 | 2/1999 |
| WO | WO9909482 | 2/1999 |
| WO | WO9957863 | 11/1999 |
| WO | WO0062232 | 10/2000 |

OTHER PUBLICATIONS

J. Heinrich: "MIPS R4000 Microprocessor User's Manual," Apr. 1, 1993, MIPS, MT. View, XP002184449, pp. 61–97.
"M68040 User's Manual", 1993, Motorola INC., p. 1–5—p. 1–9, p. 1–13–p. 1–20, p. 2–1–p. 2–3, p. 4–1, p. 8–9–p. 8–11.
"Intel 386 DX Microprocessor 32–Bit CHMOS Microprocessor With Integrated Memory Management", Dec. 31, 1995, Intel Inc., pp. 32–56; figure 4–14.
Joe Heinrich: "MIPS R4000 Microprocessor User's Manual", 1994, MIPS Technology Inc., Mountain View, CA, pp. 67–79.
Berg C: "How Do I Create a Signed Applet?", Dr. Dobb's Journal, M&T Publ., Redwood City, CA, US, vol. 22, No. 8, 8 '97, p. 109–111, 122.
Gong L et al: "Going Beyond the Sandbox: An Overview of the New Security Architecture in the Java Developement Kit 1.2", Proceedings of the Usenix Symposium on Internet Technologies and Systems, Montery, CA 13 '97, pp. 103–112.

*Primary Examiner*—Kenneth S. Kim
(74) *Attorney, Agent, or Firm*—Blakely, Sokoloff, Taylor & Zafman LLP

(57) ABSTRACT

A technique is provided to execute isolated instructions according to an embodiment of the present invention. An execution unit executes an isolated instruction in a processor operating in a platform. The processor is configured in one of a normal execution mode and an isolated execution mode. A parameter storage containing at least one parameter to support execution of the isolated instruction when the processor is configured in the isolated execution mode.

56 Claims, 13 Drawing Sheets

U.S. PATENT DOCUMENTS

| | | | |
|---|---|---|---|
| 5,479,509 A | 12/1995 | Ugon | 713/176 |
| 5,568,552 A | 10/1996 | Davis | 705/59 |
| 5,615,263 A * | 3/1997 | Takahashi | 713/164 |
| 5,657,445 A | 8/1997 | Pearce | 713/200 |
| 5,717,903 A * | 2/1998 | Bonola | 703/24 |
| 5,729,760 A | 3/1998 | Poisner | 710/3 |
| 5,764,969 A * | 6/1998 | Kahle et al. | 712/228 |
| 5,796,845 A | 8/1998 | Serikawa et al. | 381/18 |
| 5,805,712 A | 9/1998 | Davis | 713/173 |
| 5,835,594 A | 11/1998 | Albrecht et al. | 713/187 |
| 5,844,986 A | 12/1998 | Davis | 713/187 |
| 5,890,189 A | 3/1999 | Nozue et al. | 711/100 |
| 5,937,063 A | 8/1999 | Davis | 713/187 |
| 5,978,481 A | 11/1999 | Ganesan et al. | 380/266 |
| 5,987,557 A | 11/1999 | Ebrahim | 710/200 |
| 6,014,745 A | 1/2000 | Ashe | 713/193 |
| 6,058,478 A | 5/2000 | Davis | 713/191 |
| 6,175,925 B1 | 1/2001 | Nardone et al. | 713/200 |
| 6,178,509 B1 | 1/2001 | Nardone et al. | 713/200 |
| 6,205,550 B1 | 3/2001 | Nardone et al. | 713/200 |
| 6,282,651 B1 | 8/2001 | Ashe | 713/193 |
| 6,282,657 B1 | 8/2001 | Kaplan et al. | 713/201 |
| 2001/0037450 A1 | 11/2001 | Metlitski et al. | 713/152 |

* cited by examiner

EXECUTING ISOLATED MODE INSTRUCTIONS IN A SECURE SYSTEM RUNNING IN PRIVILEGE RINGS

BACKGROUND

1. Field of the Invention

This invention relates to microprocessors. In particular, the invention relates to processor security.

2. Description of Related Art

Advances in microprocessor and communication technologies have opened up many opportunities for applications that go beyond the traditional ways of doing business. Electronic commerce (E-commerce) and business-to-business (B2B) transactions are now becoming popular, reaching the global markets at a fast rate. Unfortunately, while modem microprocessor systems provide users convenient and efficient methods of doing business, communicating and transacting, they are also vulnerable to unscrupulous attacks. Examples of these attacks include virus, intrusion, security breach, and tampering, to name a few. Computer security, therefore, is becoming more and more important to protect the integrity of the computer systems and increase the trust of users.

Threats caused by unscrupulous attacks may be in a number of forms. Attacks may be remote without requiring physical accesses. An invasive remote-launched attack by hackers may disrupt the normal operation of a system connected to thousands or even millions of users. A virus program may corrupt code and/or data of a single-user platform.

Existing techniques to protect against attacks have a number of drawbacks. Anti-virus programs can only scan and detect known viruses. Most anti-virus programs use a weak policy in which a file or program is assumed good until proved bad. For many security applications, this weak policy may not be appropriate. In addition, most anit-virus programs are used locally where they are resident in the platform. This may not be suitable in a group work environment. Security co-processors or smart cards using cryptographic or other security techniques have limitations in speed performance, memory capacity, and flexibility. Redesigning operating systems creates software compatibility issues and causes tremendous investment in development efforts.

BRIEF DESCRIPTION OF THE DRAWINGS

The features and advantages of the present invention will become apparent from the following detailed description of the present invention in which.

DESCRIPTION

Figure 1A:
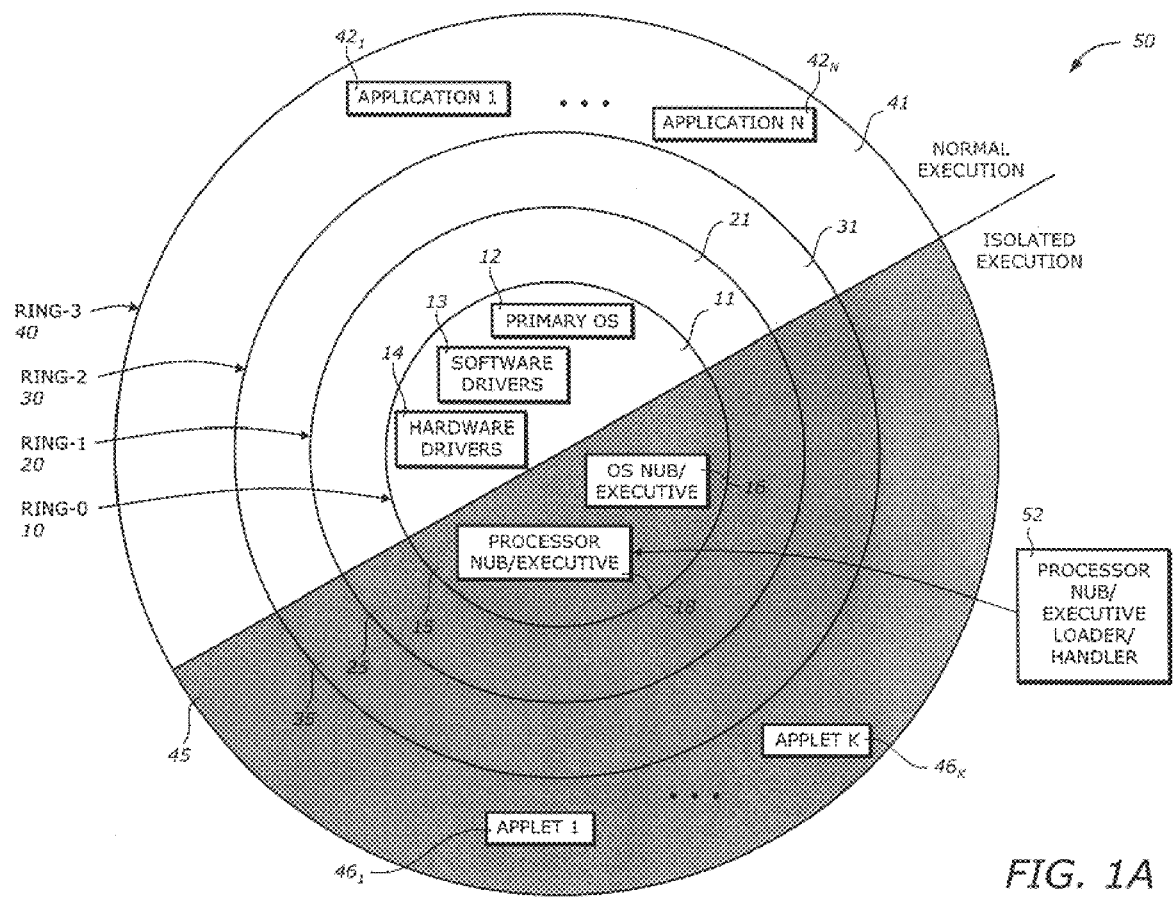
FIG. 1A is a diagram illustrating an logical operating architecture according to one embodiment of the invention.

In an embodiment of the present invention, a technique is provided to execute isolated instructions. An execution unit executes an isolated instruction in a processor operating in a platform. The processor is configured in one of a normal execution mode and an isolated execution mode. A parameter storage contains at least one parameter to support execution of the isolated instruction when the processor is configured in the isolated execution mode.

In one embodiment, the isolated instruction is one of an isolated initialize (iso_init) instruction, an isolated close (iso_close) instruction, an isolated enter (iso_enter) instruction, an isolated exit (iso_exit) instruction, an isolated configuration read (iso_config_read), and an isolated configuration write (iso_config_write) instruction. The parameter is one of an isolated feature word, an execution mode word, a logical processor value, an isolated setting including a mask value and a base value, an exit physical address, an entry physical address, and a processor nub loader physical address.

The parameter storage is one of an internal storage and an external storage. The internal storage includes a control register to store the execution mode word, a logical processor register, a mask register to store the mask value, a base register to store the base value, a frame register set, an exit frame register to store the exit address, an entry frame register to store the entry address, and a loader register to store the processor nub loader address. The external storage includes a memory controller hub (MCH) storage and an input/output controller hub (ICH) storage. The execution mode word configures the processor in the isolated execution mode.

The iso_init instruction, when executed, causes the processor to create an isolated area defined by the base value and the mask value in a memory if the isolated area has not been created, set a range of the isolated area in the MCH register, copy a processor nub loader into the isolated area using the processor nub loader address in the loader register, and execute the processor nub loader. The iso_init instruction, when executed, further causes the processor to initialize the isolated area for the platform, and obtain a location of a processor nub. The iso_init instruction causing the processor to execute the processor nub loader causes the processor to copy the processor nub into the isolated area, verify a signature of the processor nub using a public key contained in the processor nub loader, and execute the processor nub if the signature is verified. The iso_init instruction, therefore, ensures that the state of the environment or platform is clean upon creation of the isolated area.

The iso_enter instruction, when executed, causes the processor to store contents of the frame register set in an exit frame, the exit frame being pointed to by the exit address in the exit frame register, and load an entry frame into the frame register set, the entry frame being pointed to by the entry address in the entry frame register. The iso_exit instruction, when executed, causes the processor to load an exit frame into the frame register set. The exit frame is pointed by the exit address in the exit frame register. The iso_close instruction, when executed, causes the processor to reset the isolated setting in the processor if a corresponding logical processor is last to withdraw, and reset the isolated setting in the MCH and the ICH if the processor is last to withdraw. The iso_config_read instruction, when executed, causes the processor to return contents of a configuration storage corresponding to the parameter storage. The iso_config_write instruction, when executed, causes the processor to write contents of a configuration storage corresponding to the parameter storage.

The following instructions are atomic, non-interruptible, to assure the integrity of the environment and/or platform: iso_enter, iso_exit, iso_close, iso_config_read, iso_configu_write. The iso_enter instruction, when executed, causes the processor to store contents of the frame register set in an exit frame, the exit frame being pointed to by the exit address in the exit frame register, and load an entry frame into the frame register set, the entry frame being pointed to by the entry address in the entry frame register. The iso_exit instruction, when executed, causes the processor to load an exit frame into the frame register set. The exit frame is pointed by the exit address in the exit frame register. The iso_close instruction, when executed, causes the processor to reset the isolated setting in the processor if a corresponding logical processor is last to withdraw, and reset the isolated setting in the MCH and the ICH if the processor is last to withdraw. The iso_config_read instruction, when executed, causes the processor to return contents of a configuration storage corresponding to the parameter storage. The iso_config_write instruction, when executed, causes the processor to write contents of a configuration storage corresponding to the parameter storage.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Architecture Overview

One principle for providing security in a computer system or platform is the concept of an isolated execution architecture. The isolated execution architecture includes logical and physical definitions of hardware and software components that interact directly or indirectly with an operating system of the computer system or platform. An operating system and the processor may have several levels of hierarchy, referred to as rings, corresponding to various operational modes. A ring is a logical division of hardware and software components that are designed to perform dedicated tasks within the operating system. The division is typically based on the degree or level of privilege, namely, the ability to make changes to the platform. For example, a ring-0 is the innermost ring, being at the highest level of the hierarchy. Ring-0 encompasses the most critical, privileged components. In addition, modules in Ring-0 can also access to lesser privileged data, but not vice versa. Ring-3 is the outermost ring, being at the lowest level of the hierarchy. Ring-3 typically encompasses users or applications level and has the least privilege. Ring-1 and ring-2 represent the intermediate rings with decreasing levels of privilege.

FIG. 1A is a diagram illustrating a logical operating architecture 50 according to one embodiment of the invention. The logical operating architecture 50 is an abstraction of the components of an operating system and the processor. The logical operating architecture 50 includes ring-0 10, ring-1 20, ring-2 30, ring-3 40, and a processor nub loader 52. The processor nub loader 52 is an instance of a processor executive (PE) handler. The PE handler is used to handle and/or manage a processor executive (PE) as will be discussed later. The logical operating architecture 50 has two modes of operation: normal execution mode and isolated execution mode. Each ring in the logical operating architecture 50 can operate in both modes. The processor nub loader 52 operates only in the isolated execution mode.

Ring-0 10 includes two portions: a normal execution Ring-0 11 and an isolated execution Ring-0 15. The normal execution Ring-0 11 includes software modules that are critical for the operating system, usually referred to as kernel. These software modules include primary operating system (e.g., kernel) 12, software drivers 13, and hardware drivers 14. The isolated execution Ring-0 15 includes an operating system (OS) nub 16 and a processor nub 18. The OS nub 16 and the processor nub 18 are instances of an OS executive (OSE) and processor executive (PE), respectively. The OSE and the PE are part of executive entities that operate in a secure environment associated with the isolated area 70 and the isolated execution mode. The processor nub loader 52 is a protected bootstrap loader code held within a chipset in the system and is responsible for loading the processor nub 18 from the processor or chipset into an isolated area as will be explained later.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $42_1$ to $42_N$ and isolated execution ring-3 includes K applets $46_1$ to $46_K$.

One concept of the isolated execution architecture is the creation of an isolated region in the system memory, referred to as an isolated area, which is protected by both the processor and chipset in the computer system. The isolated region may also be in cache memory, protected by a translation look aside (TLB) access check. Access to this isolated region is permitted only from a front side bus (FSB) of the processor, using special bus (e.g., memory read and write) cycles, referred to as isolated read and write cycles. The special bus cycles are also used for snooping. The isolated read and write cycles are issued by the processor executing in an isolated execution mode. The isolated execution mode is initialized using a privileged instruction in the processor, combined with the processor nub loader 52. The processor nub loader 52 verifies and loads a ring-0 nub software module (e.g., processor nub 18) into the isolated area. The processor nub 18 provides hardware-related services for the isolated execution.

One task of the processor nub 18 is to verify and load the ring-0 OS nub 16 into the isolated area, and to generate the root of a key hierarchy unique to a combination of the platform, the processor nub 18, and the operating system nub 16. The operating system nub 16 provides links to services in the primary OS 12 (e.g., the unprotected segments of the operating system), provides page management within the isolated area, and has the responsibility for loading ring-3 application modules 45, including applets $46_1$ to $46_K$, into protected pages allocated in the isolated area. The operating system nub 16 may also load ring-0 supporting modules.

The operating system nub 16 may choose to support paging of data between the isolated area and ordinary (e.g., non-isolated) memory. If so, then the operating system nub 16 is also responsible for encrypting and hashing the isolated area pages before evicting the page to the ordinary memory, and for checking the page contents upon restoration of the page. The isolated mode applets $46_1$ to $46_K$ and their data are tamper-resistant and monitor-resistant from all software attacks from other applets, as well as from non-isolated-space applications (e.g., $42_1$ to $42_N$), dynamic link libraries (DLLs), drivers and even the primary operating system 12. Only the processor nub 18 or the operating system nub 16 can interfere with or monitor the applet's execution.

Figure 1B:
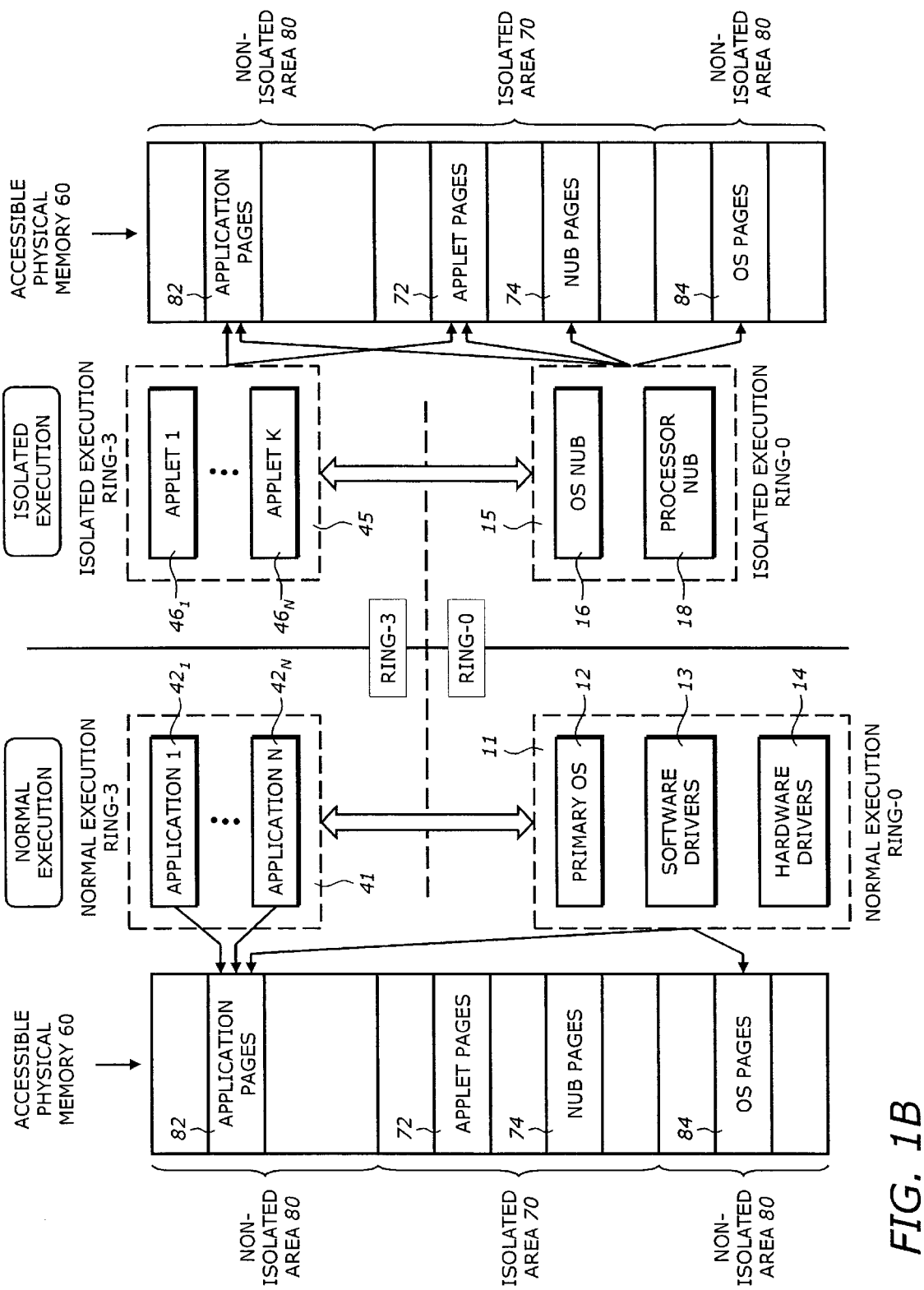
FIG. 1B is a diagram illustrating accessibility of various elements in the operating system and the processor according to one embodiment of the invention.

FIG. 1B is a diagram illustrating accessibility of various elements in the operating system 10 and the processor according to one embodiment of the invention. For illustration purposes, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a non-isolated area 80. The isolated area 70 includes applet pages 72 and nub pages 74. The non-isolated area 80 includes application pages 82 and operating system pages 84. The isolated area 70 is accessible only to elements of the operating system and processor operating in isolated execution mode. The non-isolated area 80 is accessible to all elements of the ring-0 operating system and to the processor.

The normal execution ring-0 11 including the primary OS 12, the software drivers 13, and the hardware drivers 14, can access both the OS pages 84 and the application pages 82. The normal execution ring-3, including applications $42_1$ to $42_N$, can access only to the application pages 82. Both the normal execution ring-0 11 and ring-3 41, however, cannot access the isolated area 70.

The isolated execution ring-0 15, including the OS nub 16 and the processor nub 18, can access to both of the isolated area 70, including the applet pages 72 and the nub pages 74, and the non-isolated area 80, including the application pages 82 and the OS pages 84. The isolated execution ring-3 45, including applets $46_1$ to $46_K$, can access only to the application pages 82 and the applet pages 72. The applets $46_1$ to $46_K$ reside in the isolated area 70.

Figure 1C:
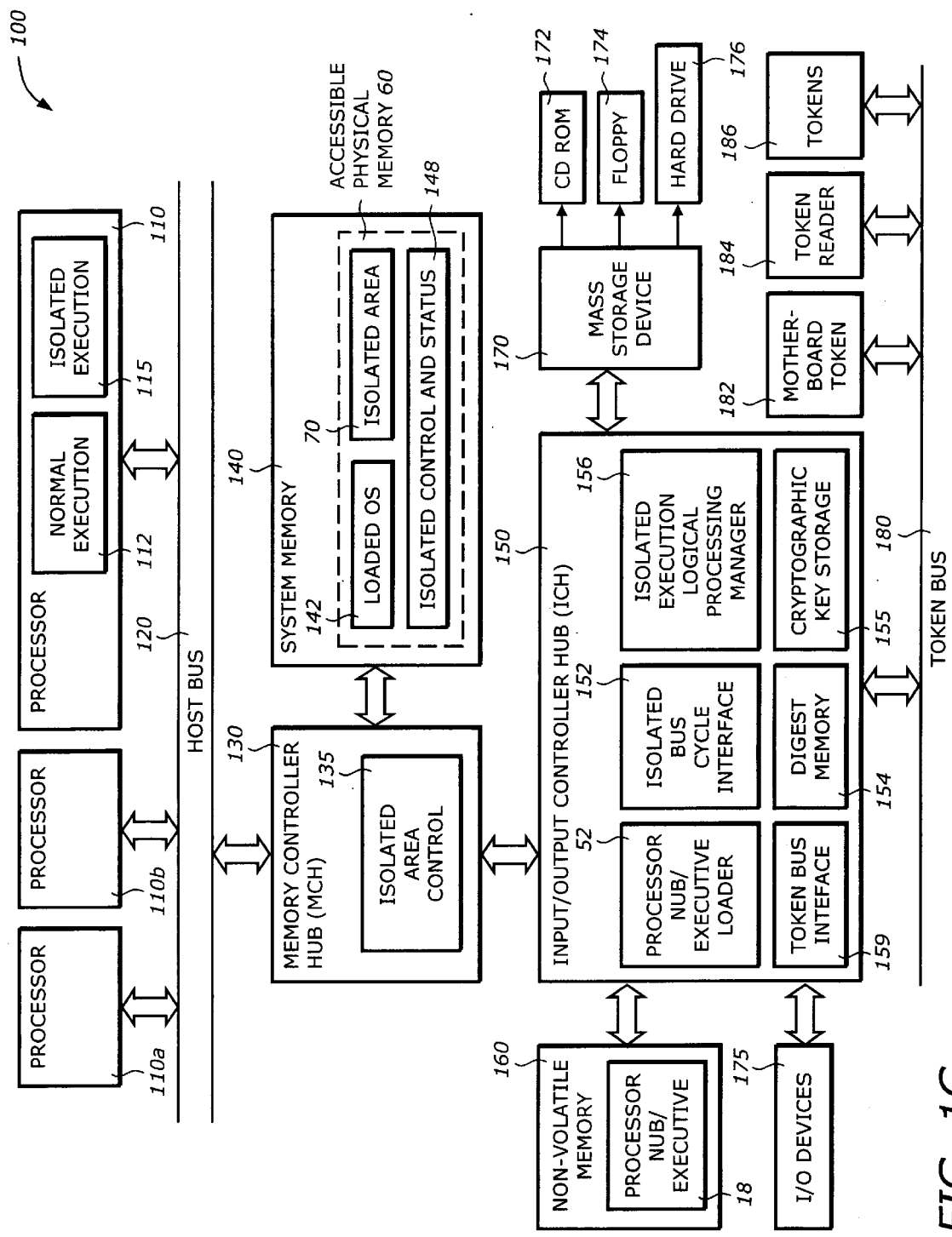
FIG. 1C is a diagram illustrating a computer system in which one embodiment of the invention can be practiced.

FIG. 1C is a diagram illustrating a computer system 100 in which one embodiment of the invention can be practiced. The computer system 100 includes a processor 110, a host bus 120, a memory controller hub (MCH) 130, a system memory 140, an input/output controller hub (ICH) 150, a non-volatile memory, or system flash, 160, a mass storage device 170, input/output devices 175, a token bus 180, a motherboard (MB) token 182, a reader 184, and a token 186. The MCH 130 may be integrated into a chipset that integrates multiple functionalities such as the isolated execution mode, host-to-peripheral bus interface, memory control. Similarly, the ICH 150 may also be integrated into a chipset together or separate from the MCH 130 to perform I/O functions. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The processor 110 represents a central processing unit of any type of architecture, such as complex instruction set computers (CISC), reduced instruction set computers (RISC), very long instruction word (VLIW), or hybrid architecture. In one embodiment, the processor 110 is compatible with an Intel Architecture (IA) processor, such as the Pentium™ series, the IA-32™ and the IA-64™. The processor 110 includes a normal execution mode 112 and an isolated execution circuit 115. The normal execution mode 112 is the mode in which the processor 110 operates in a non-secure environment, or a normal environment without the security features provided by the isolated execution mode. The isolated execution circuit 115 provides a mechanism to allow the processor 110 to operate in an isolated execution mode. The isolated execution circuit 115 provides hardware and software support for the isolated execution mode. This support includes configuration for isolated execution, definition of an isolated area, definition (e.g., decoding and execution) of isolated instructions, generation of isolated access bus cycles, and generation of isolated mode interrupts.

In one embodiment, the computer system 100 can be a single processor system, such as a desktop computer, which has only one main central processing unit, e.g. processor 110. In other embodiments, the computer system 100 can include multiple processors, e.g. processors 110, 110a, 110b, etc., as shown in FIG. 1C. Thus, the computer system 100 can be a multi-processor computer system having any number of processors. For example, the multi-processor computer system 100 can operate as part of a server or workstation environment. The basic description and operation of processor 110 will be discussed in detail below. It will be appreciated by those skilled in the art that the basic description and operation of processor 110 applies to the other processors 110a and 110b, shown in FIG. 1C, as well as any number of other processors that may be utilized in the multi-processor computer system 100 according to one embodiment of the present invention.

The processor 110 may also have multiple logical processors. A logical processor, sometimes referred to as a thread, is a functional unit within a physical processor having an architectural state and physical resources allocated according to some partitioning policy. Within the context of the present invention, the terms "thread" and "logical processor" are used to mean the same thing. A multi-threaded processor is a processor having multiple threads or multiple logical processors. A multi-processor system (e.g., the system comprising the processors 110, 110a, and 110b) may have multiple multi-threaded processors.

The host bus 120 provides interface signals to allow the processor 110 or processors 110, 100a, and 110b to communicate with other processors or devices, e.g., the MCH 130. In addition to normal mode, the host bus 120 provides an isolated access bus mode with corresponding interface signals for memory read and write cycles when the processor 110 is configured in the isolated execution mode. The isolated access bus mode is asserted on memory accesses initiated while the processor 110 is in the isolated execution mode. The isolated access bus mode is also asserted on instruction pre-fetch and cache write-back cycles if the address is within the isolated area address range and the processor 110 is initialized in the isolated execution mode. The processor 110 responds to snoop cycles to a cached address within the isolated area address range if the isolated access bus cycle is asserted and the processor 110 is initialized into the isolated execution mode.

The MCH 130 provides control and configuration of memory and input/output devices such as the system memory 140 and the ICH 150. The MCH 130 provides interface circuits to recognize and service isolated access assertions on memory reference bus cycles, including isolated memory read and write cycles. In addition, the MCH 130 has memory range registers (e.g., base and length registers) to represent the isolated area in the system memory 140. Once configured, the MCH 130 aborts any access to the isolated area that does not have the isolated access bus mode asserted.

The system memory 140 stores system code and data. The system memory 140 is typically implemented with dynamic random access memory (DRAM) or static random access memory (SRAM). The system memory 140 includes the accessible physical memory 60 (shown in FIG. 1B). The accessible physical memory includes a loaded operating system 142, the isolated area 70 (shown in FIG. 1B), and an isolated control and status space 148. The loaded operating system 142 is the portion of the operating system that is loaded into the system memory 140. The loaded OS 142 is typically loaded from a mass storage device via some boot code in a boot storage such as a boot read only memory (ROM). The isolated area 70, as shown in FIG. 1B, is the memory area that is defined by the processor 110 when operating in the isolated execution mode. Access to the isolated area 70 is restricted and is enforced by the processor 110 and/or the MCH 130 or other chipset that integrates the isolated area functionalities. The isolated control and status space 148 is an input/output (I/O)-like, independent address space defined by the processor 110 and/or the MCH 130. The isolated control and status space 148 contains mainly the isolated execution control and status registers. The isolated control and status space 148 does not overlap any existing address space and is accessed using the isolated bus cycles. The system memory 140 may also include other programs or data which are not shown.

The ICH 150 represents a known single point in the system having the isolated execution functionality. For clarity, only one ICH 150 is shown. The system 100 may have many ICH's similar to the ICH 150. When there are multiple ICH's, a designated ICH is selected to control the isolated area configuration and status. In one embodiment, this selection is performed by an external strapping pin. As is known by one skilled in the art, other methods of selecting can be used, including using programmable configuring registers. The ICH 150 has a number of functionalities that are designed to support the isolated execution mode in addition to the traditional I/O functions. In particular, the ICH 150 includes an isolated bus cycle interface 152, the processor nub loader 52 (shown in FIG. 1A), a digest memory 154, a cryptographic key storage 155, an isolated execution logical processor manager 156, and a token bus interface 159.

The isolated bus cycle interface 152 includes circuitry to interface to the isolated bus cycle signals to recognize and service isolated bus cycles, such as the isolated read and write bus cycles. The processor nub loader 52, as shown in FIG. 1A, includes a processor nub loader code and its digest (e.g., hash) value. The processor nub loader 52 is invoked by execution of an appropriate isolated instruction (e.g., Iso_Init) and is transferred to the isolated area 70. From the isolated area 80, the processor nub loader 52 copies the processor nub 18 from the system flash memory (e.g., the processor nub code 18 in non-volatile memory 160) into the isolated area 70, verifies and logs its integrity, and manages a symmetric key used to protect the processor nub's secrets. In one embodiment, the processor nub loader 52 is implemented in read only memory (ROM). For security purposes, the processor nub loader 52 is unchanging, tamper-resistant and non-substitutable. The digest memory 154, typically implemented in RAM, stores the digest (e.g., hash) values of the loaded processor nub 18, the operating system nub 16, and any other critical modules (e.g., ring-0 modules) loaded into the isolated execution space. The cryptographic key storage 155 holds a symmetric encryption/decryption key that is unique for the platform of the system 100. In one embodiment, the cryptographic key storage 155 includes internal fuses that are programmed at manufacturing. Alternatively, the cryptographic key storage 155 may also be created with a random number generator and a strap of a pin. The isolated execution logical processor manager 156 manages the operation of logical processors operating in isolated execution mode. In one embodiment, the isolated execution logical processor manager 156 includes a logical processor count register that tracks the number of logical processors participating in the isolated execution mode. The token bus interface 159 interfaces to the token bus 180. A combination of the processor nub loader digest, the processor nub digest, the operating system nub digest, and optionally additional digests, represents the overall isolated execution digest, referred to as isolated digest. The isolated digest is a fingerprint identifying the ring-0 code controlling the isolated execution configuration and operation. The isolated digest is used to attest or prove the state of the current isolated execution.

The non-volatile memory 160 stores non-volatile information. Typically, the nonvolatile memory 160 is implemented in flash memory. The non-volatile memory 160 includes the processor nub 18. The processor nub 18 provides the initial set-up and low-level management of the isolated area 70 (in the system memory 140), including verification, loading, and logging of the operating system nub 16, and the management of the symmetric key used to protect the operating system nub's secrets. The processor nub 18 may also provide application programming interface (API) abstractions to low-level security services provided by other hardware. The processor nub 18 may also be distributed by the original equipment manufacturer (OEM) or operating system vendor (OSV) via a boot disk.

The mass storage device 170 stores archive information such as code (e.g., processor nub 18), programs, files, data, applications (e.g., applications $42_1$ to $42_N$), applets (e.g., applets $46_1$ to $46_K$) and operating systems. The mass storage device 170 may include compact disk (CD) ROM 172, floppy diskettes 174, and hard drive 176, and any other magnetic or optical storage devices. The mass storage device 170 provides a mechanism to read machine-readable media. When implemented in software, the elements of the present invention are the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk CD-ROM, an optical disk, a hard disk, a fiber optical medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, an Intranet, etc.

I/O devices 175 may include any I/O devices to perform I/O functions. Examples of I/O devices 175 include a controller for input devices (e.g., keyboard, mouse, trackball, pointing device), media card (e.g., audio, video, graphics), a network card, and any other peripheral controllers.

The token bus 180 provides an interface between the ICH 150 and various tokens in the system. A token is a device that performs dedicated input/output functions with security functionalities. A token has characteristics similar to a smart card, including at least one reserved-purpose public/private key pair and the ability to sign data with the private key. Examples of tokens connected to the token bus 180 include a motherboard token 182, a token reader 184, and other portable tokens 186 (e.g., smart card). The token bus interface 159 in the ICH 150 connects through the token bus 180 to the ICH 150 and ensures that when commanded to prove the state of the isolated execution, the corresponding token (e.g., the motherboard token 182, the token 186) signs only valid isolated digest information. For purposes of security, the token should be connected to the digest memory.

ISOLATED INSTRUCTIONS

Figure 2:
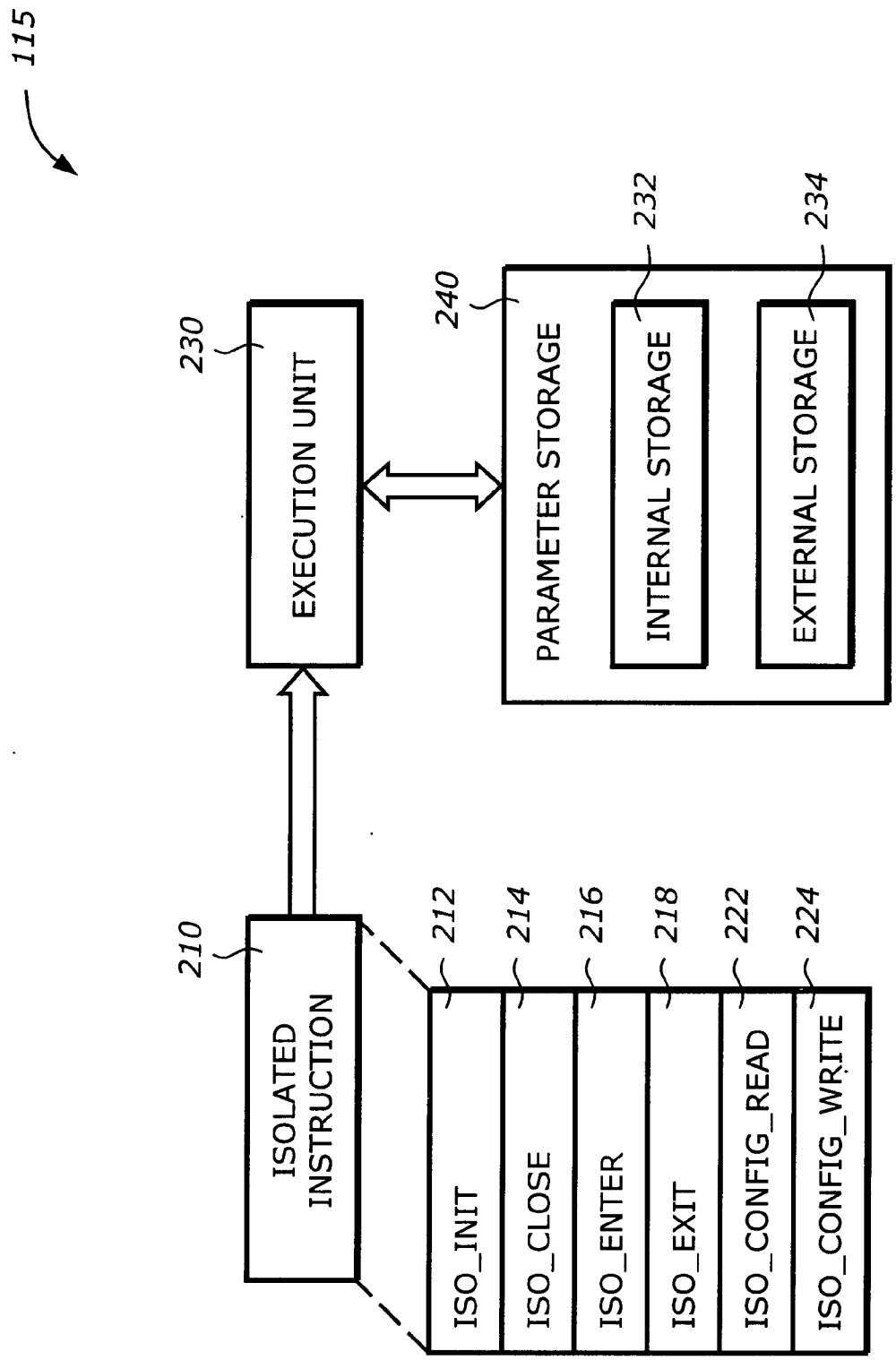
FIG. 2 is a diagram illustrating an architecture for isolated instructions according to one embodiment of the invention.

FIG. 2 is a diagram illustrating a part of the isolated execution circuit 115 shown in FIG. 1C according to one embodiment of the invention. The isolated execution circuit 115 includes an execution unit 230 and a parameter storage 240.

The execution unit 230 executes an isolated instruction in the processor 110, shown in FIG. 1C. As discussed above, the processor 110 operates in a platform including the MCH 130, the system memory 140, the ICH 150, and the token bus 180 as shown in FIG. 1C. In addition, the processor 110 is configured in one of a normal execution mode and an isolated execution mode. The execution unit 230 may include a decoder to decode the isolated instruction, sub execution units to carry out the tasks in the decoded instruction, an arithmetic and logic unit (ALU) to perform arithmetic and logic functions, and associated registers. The execution unit 230 receives an isolated instruction 210.

The isolated instruction 210 may also be a macro instruction, which includes a number of micro-instructions, or assembly language level instructions. The isolated instruction 210 may also be a high level language instruction or a function, s routine, a subprogram in a high level language. In what follows, the term "instruction" refers to an abstract conception of a task or a function that is executed by the processor 110 (FIG. 1C). This task or function can be accomplished by a single operation, a series of micro-operations, a microcode routine, a macro instruction, an assembly language routine or function, a high level language statement, a high level language subroutine or subprogram or function, or a dedicated hardware circuit.

The isolated instruction 210 includes a number of instructions. In one embodiment, these instructions include an isolated initialize (iso_init) instruction 212, an isolated close (iso_close) instruction 214, an isolated enter (iso_enter) instruction 216, an isolated exit (iso_exit) instruction 218, an isolated configuration read (iso_config_read) 222, and an isolated configuration write (iso_config_write) instruction 224. The iso_init instruction 212 may also be referred to as an isolated create (iso_create) instruction.

The parameter storage 240 contains at least one parameter to support execution of the isolated instruction 210 when the processor 110 is configured in the isolated execution mode. The parameter storage 240 includes an internal storage 232 and an external storage 234. The internal storage 232 is internal to the processor 110 and the external storage 234 is external to the processor 110. The parameter is one of an isolated feature word, an execution mode word, a logical processor value, an isolated setting including a mask value and a base value, a frame, an exit physical address, an entry physical address, and a processor nub loader physical address.

Figure 3:
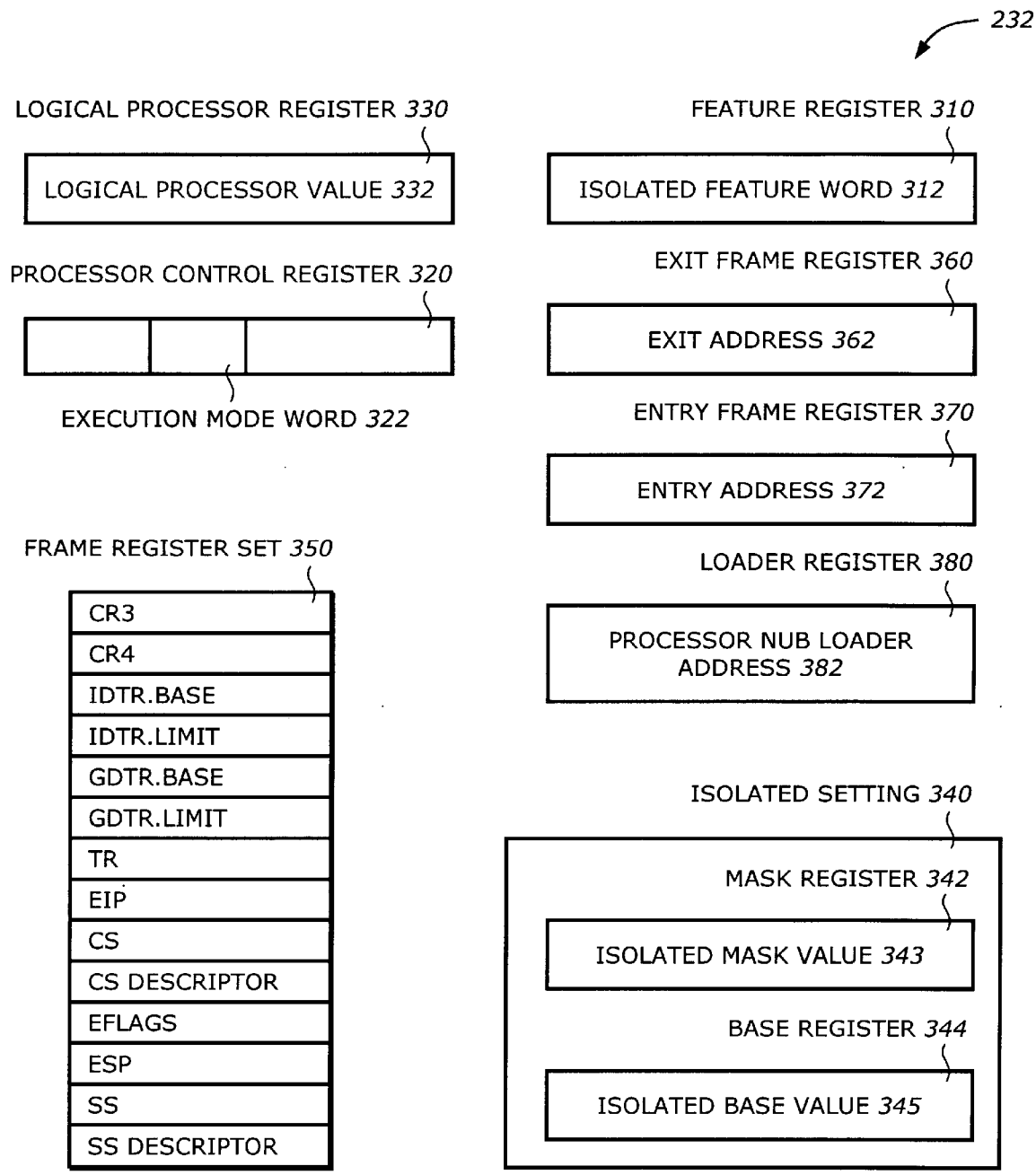
FIG. 3 is a diagram illustrating an internal storage according to one embodiment of the invention.

FIG. 3 is a diagram illustrating the internal storage 232 shown in FIG. 2 according to one embodiment of the invention. The internal storage 232 includes a feature register 310, a processor control register 320, a logical processor register 330, an isolated setting register 340, a frame register set 350, an exit frame register 360, an entry frame register 370, and a loader register 380.

The feature register 310 stores the isolated feature word. The isolated feature word indicates that the isolated instructions are present in the processor 110 and which features of the isolated instructions are present. Examples of the features may include the type of isolated instructions, a random number, and a random number status. The processor control register 320 stores an execution mode word 322. The execution mode word 322 stores a bit to indicate if the processor is configured in the isolated execution mode. In one embodiment, the execution mode word is accessed only by the instructions that transfer control to or from the isolated execution mode. Examples of these instructions include the iso_init, iso_enter, and iso_exit instructions.

The logical processor register 330 stores a logical processor value 332. The logical processor value 332 indicates the number of logical processors that enter the isolated execution mode. A physical processor may have a number of logical processors, each logical processor corresponds to a logical processor. Initially, the logical processor value 332 is zero. When a logical processor enters the isolated execution mode, the logical processor value 332 increments by one. When a logical processor exits the isolated execution mode, the logical processor value decrements by one. The logical processor value 332 has a maximum value to limit the number of logical processors in the isolated execution mode. When a logical processor exits and the logical processor value 332 decrements to zero, that logical processor knows that it is the last logical processor to withdraw from the isolated execution mode.

The frame register set 350 stores a number of values corresponding to a frame. A frame includes a number of register values that need to be saved or restored when there is an exit out of or entry into an isolated execution mode. Typically these frame values are those values that are necessary to keep track of the state of the processor. In one embodiment, the processor is a Pentium-type. The frame information includes the values of the control register 3 (CR3), control register 4 (CR4), the Interrupt Descriptor Task Register (IDTR) base, IDTR limit, the Global Descriptor Task Register (GDTR) base value, the GDTR limit value, the task register (TR) value, the extended instruction pointer (EIP), the code segment (CS) value, the CS descriptor, the extended flags (EFLAGS), the extended stack pointer (ESP), the stack segment (SS) value, and the SS descriptor. A frame corresponding to an exit out of or entry into an isolated execution mode is referred to an exit frame or an entry frame, respectively.

The exit frame register 360 stores an exit address 362. The exit address 362 is the physical address of the exit frame. The entry frame register 370 stores an entry address 372. The entry address 372 is the physical address of the entry frame. The load register 380 stores a processor nub loader address 382. The processor nub loader address 382 is the physical address of the processor nub loader 52.

Figure 4:
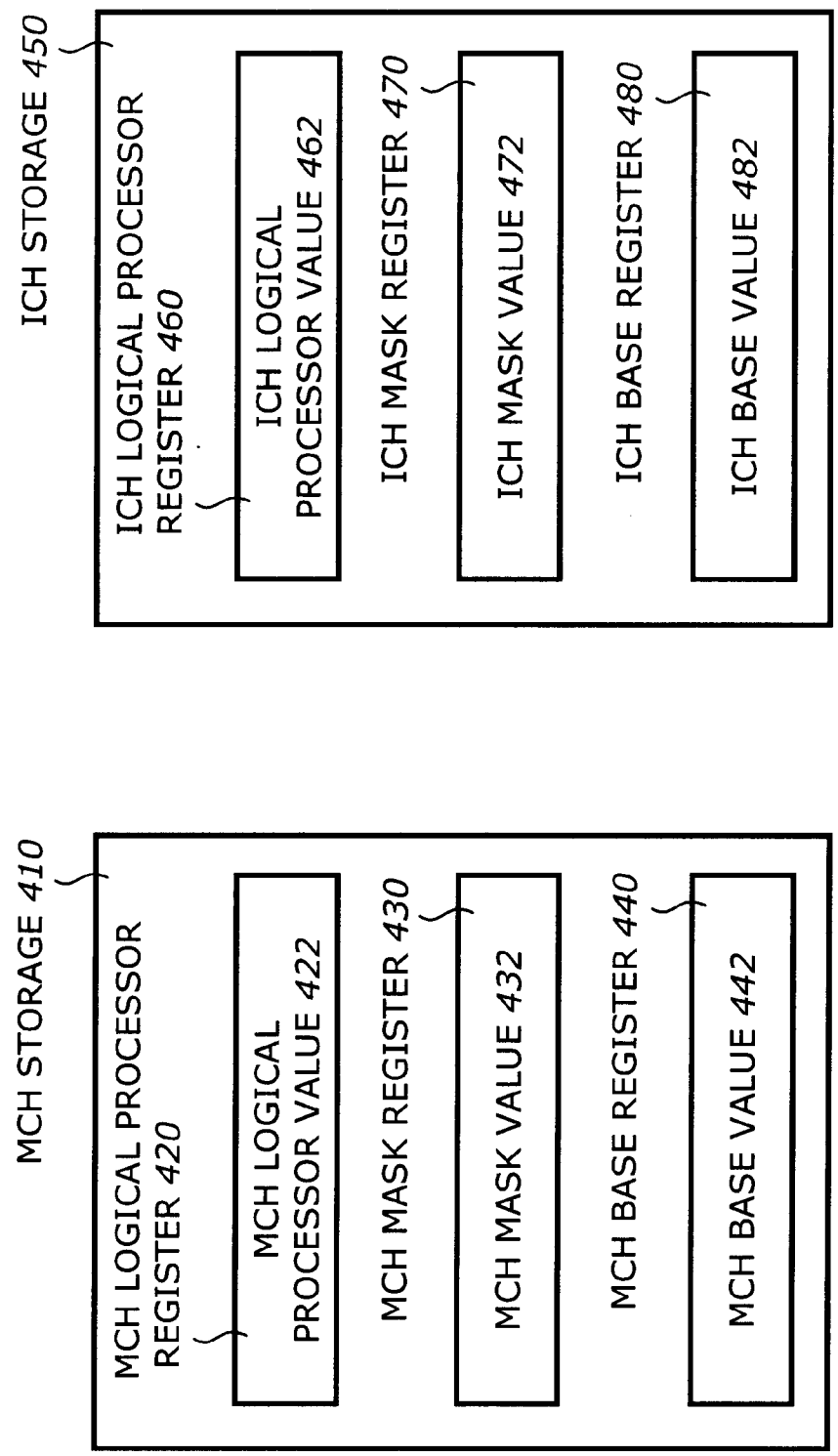
FIG. 4 is a diagram illustrating an external storage according to one embodiment of the invention.

FIG. 4 is a diagram illustrating the external storage 234 shown in FIG. 2 according to one embodiment of the invention. The external storage 234 includes the MCH storage 410 and ICH storage 450.

The MCH storage 410 is in the MCH and is a part of the Isolated Area Control 135 shown in FIG. 1C. The MCH storage 410 includes an MCH logical processor register 420, an MCH mask register 430, and an MCH base register 440. The MCH logical processor register 420 stored an MCH logical processor value 422. The MCH logical processor value 422 indicates the number of logical processors that are configured to use the isolated area 70 in the system memory 140 as shown in FIG. 1C. The MCH mask register 430 and base register 440 store the MCH mask value 432 and MCH base value 442, respectively. The MCH mask 432 value and the MCH base value 442 are used to define the isolated area 70.

The ICH storage 450 is in the ICH shown in FIG. 1C. The ICH storage 450 includes an ICH logical processor register 460, an ICH mask register 470, and an ICH base register 480. The ICH logical processor register 460 stores an ICH logical processor value 462. The ICH logical processor value 462 indicates the number of logical processors that are configured to use the isolated area 70 in the system memory 140 as shown in FIG. 1C. The ICH mask register 470 and base register 480 store an ICH mask value 472 and ICH base value 482, respectively. The ICH mask value 472 and the ICH base value 482 are used to define the isolated area 70. The ICH logical processor value 462 refers to all logical processors in the register, including those in separate different physical processors. The MCH logical processor value 422, however, refers only to the logical processors in the physical processor that the corresponding MCH is directly coupled to.

Figure 5:
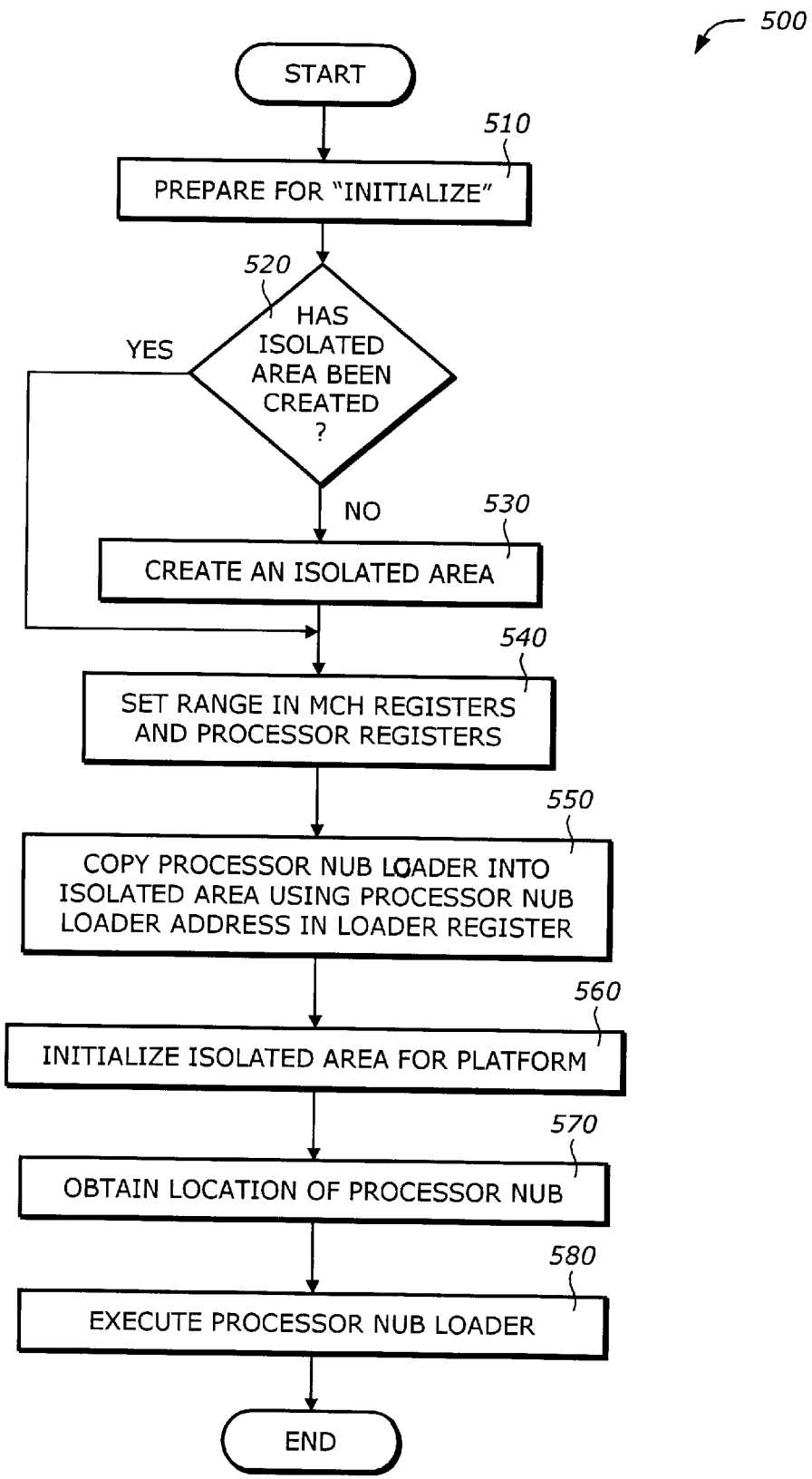
FIG. 5 is a flowchart illustrating a process to execute the iso_init instruction according to one embodiment of the invention.

FIG. 5 is a flowchart illustrating a process 500 to execute the iso_init instruction according to one embodiment of the invention.

Upon START, the process 500 prepares for the initialization (Block 510). This preparation may includes verification of the protected non-paging mode, verification of the validity of the isolated area mask and base values. Then, the process 500 determines if the isolated area has been created (Block 520). If yes, the process 500 goes to Block 540. Otherwise, the process 500 creates an isolated area (Block 530). The process of creating will be described in FIG. 6A.

The process 500 then sets the range in the MCH registers and the processor registers (Block 540). This includes updating the processor mask and base registers and the MCH mask and base registers. Next, the process 500 copies the processor nub loader from the ICH into the isolated area using the processor nub loader address in the loader register (Block 550).

Then the process 500 initializes the isolated area for the platform (Block 560). Then the process 500 obtains a location, or a physical address, of the processor nub (Block 570). Next, the process 500 transfers control to the processor nub loader by executing the processor nub loader code (Block 580). The process 500 is then terminated.

Figure 6A:
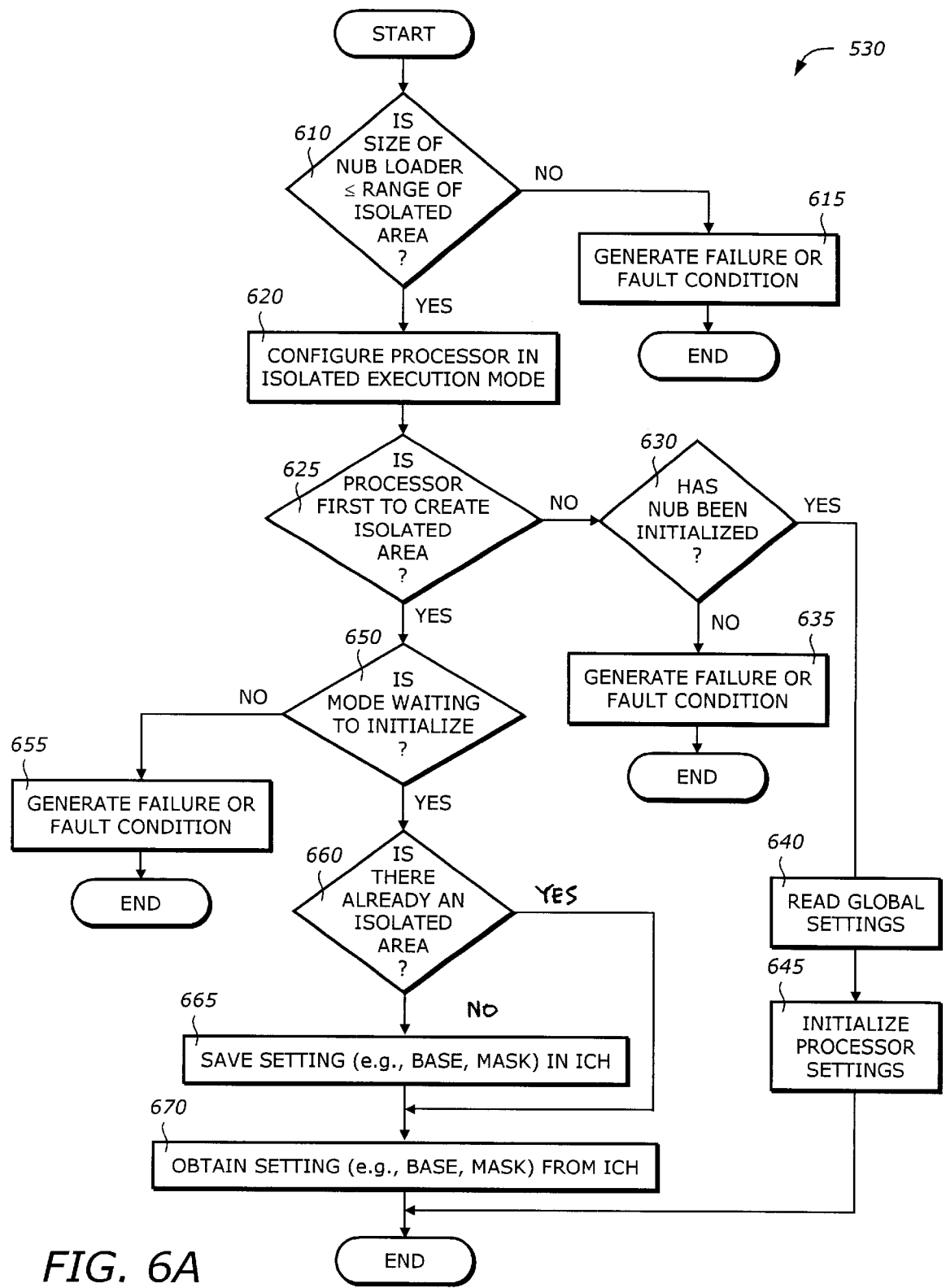
FIG. 6A is a flowchart illustrating a process to execute the creating function in the iso_init instruction according to one embodiment of the invention.

FIG. 6A is a flowchart illustrating the process 530 to execute the creating function in the iso_init instruction according to one embodiment of the invention.

Upon START, the process 530 determines if the size of the processor nub loader is less than or equal to the range of the isolated area as defined by the mask value (Block 610). If not, then the isolated area is not large enough to store the entire processor nub loader, the process 530 generates a failure or fault condition (Block 615). Otherwise, the process 530 configures the processor in the isolated execution mode by setting the appropriate bit(s) in the execution mode word (Block 620).

Then, the process 530 determines if the processor is the first processor to create the isolated area (Block 625). If not, the process 530 determines if the processor nub has been initialized (Block 630). If the processor nub has not been initialized, the process 530 generates a failure or fault condition (Block 635). If the processor nub has been properly initialized, the process 530 reads the global processor settings including the mask and base values (Block 640). Then the process 530 initialize the processor settings by transferring the global settings into the processor settings (Block 645). The process 530 is then terminated or returned to the main process.

If the processor is the first processor to create the isolated area, the process 530 determines if the mode is waiting for initialization (Block 650). This can be achieved by reading a status value from the ICH. If the status indicates that the mode is not waiting for initialization, the process 530 generates a failure or fault condition (Block 655). Otherwise, the process 530 determines if there is already an isolated area (Block 660). If there is already an isolated area, the process 530 goes to block 670. If there is not an isolated area, the process 530 saves the settings (e.g., base and mask values) in the ICH (Block 665). Then the process 530 obtains the settings (e.g., base and mask values) from the ICH (Block 67)). The process 530 is then terminated or returned to the main process.

Figure 6B:
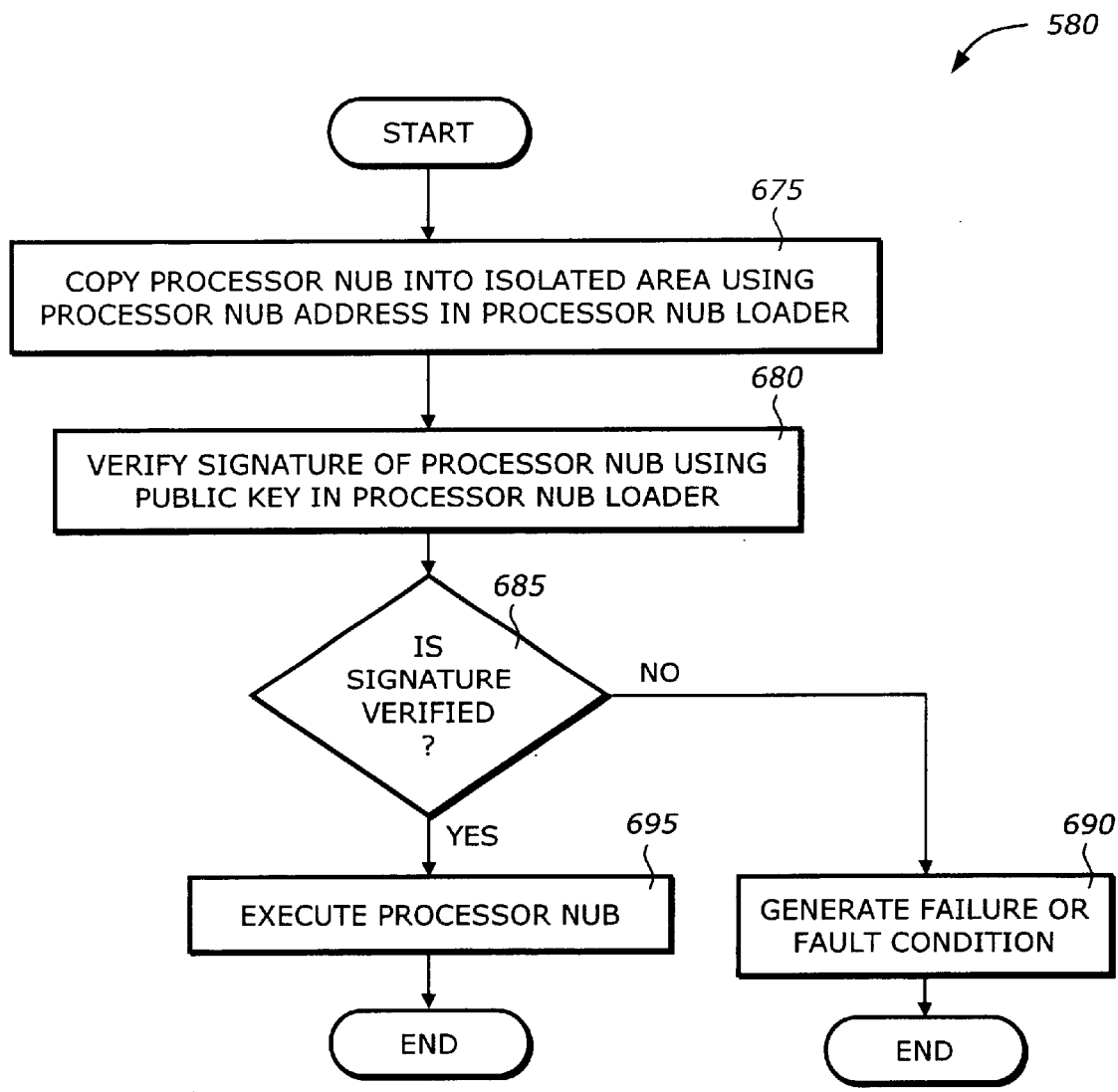
FIG. 6B is a flowchart illustrating a process to execute the processor nub loader function in the iso_init instruction according to one embodiment of the invention.

FIG. 6B is a flowchart illustrating the process 580 to execute the processor nub loader function in the iso_init instruction according to one embodiment of the invention.

Upon START, the process 580 copies the processor nub into the isolated area using the processor nub physical address in the processor nub loader (Block 675). Then the process 580 verifies the signature of the processor nub using a public key in the processor nub loader (Block 680). Next, the process 580 determines if the signature is verified (Block 685). If it is not verified, the process 580 generates a failure or fault condition (Block 690). Otherwise, the process 580 executes the processor nub (Block 695). The process 580 is then terminated or returned to the main process.

Figure 7:
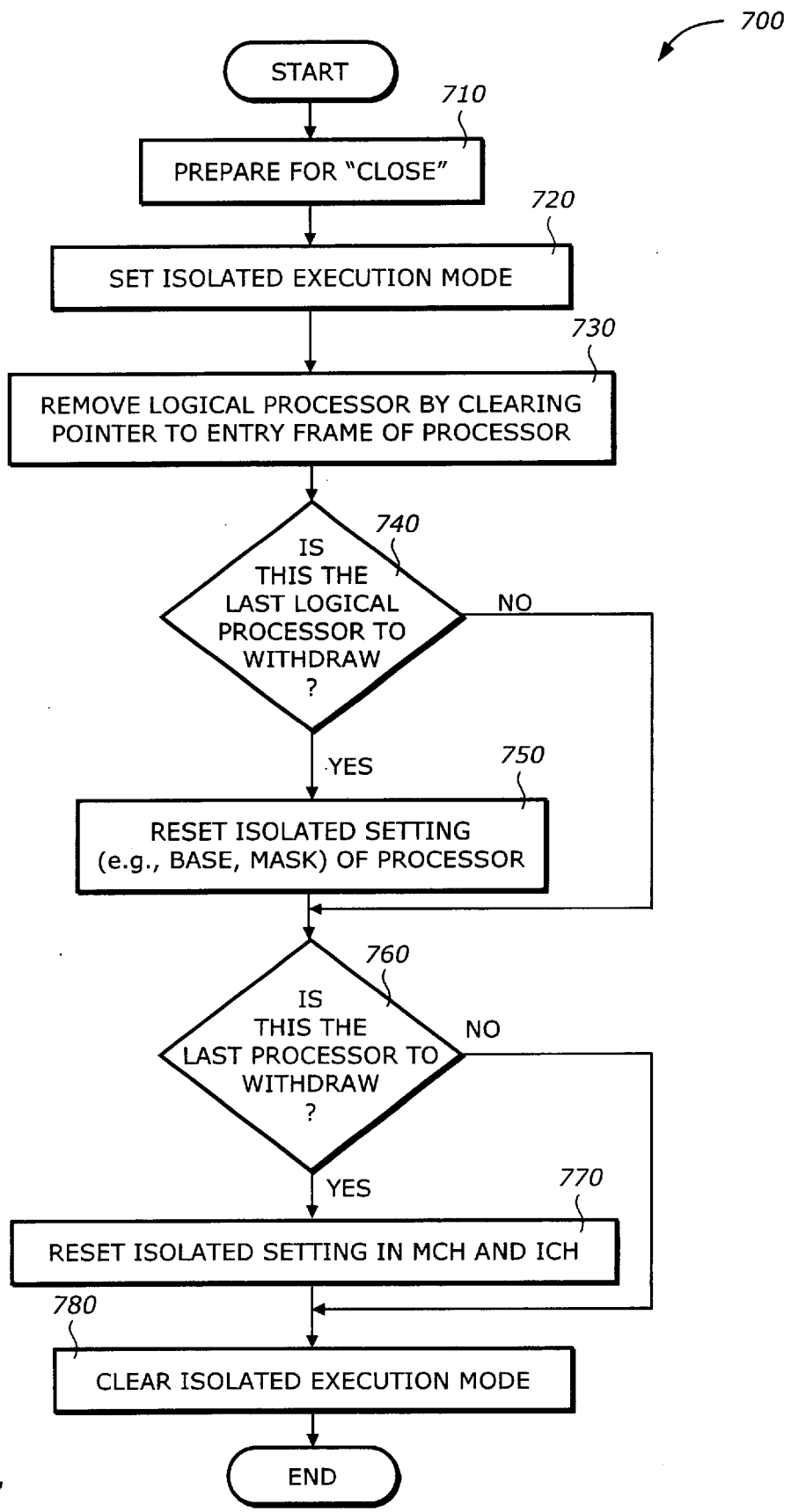
FIG. 7 is a flowchart illustrating a process to execute the iso_close instruction according to one embodiment of the invention.

FIG. 7 is a flowchart illustrating a process 700 to execute the iso_close instruction according to one embodiment of the invention.

Upon START, the process 700 prepares for close (Block 710). The preparation may include obtaining the exit frame and saving the current IDTR limit. Then, the process 700 sets the isolated execution mode by configuring the isolated execution mode word (Block 720). Next, the process 700 removes the processor's logical processor by clearing the pointer to the entry frame of the processor (Block 730).

Then the process 700 determines if this is the last logical processor to withdraw from the isolated execution mode (Block 740). If not, the process 700 goes to block 760. Otherwise, the process 700 resets the isolated setting values (e.g., base and mask values) of the processor (Block 750). Then, the process 700 determines if this is the last processor to withdraw from the isolated execution mode (Block 760). If not, the process 700 goes to Block 780. Otherwise, the process 700 resets the isolated settings in the MCH and ICH (Block 770). Then, the process 700 clears the isolated execution mode by writing to the execution mode word (Block 780). The process 700 is then terminated.

Figure 8A:
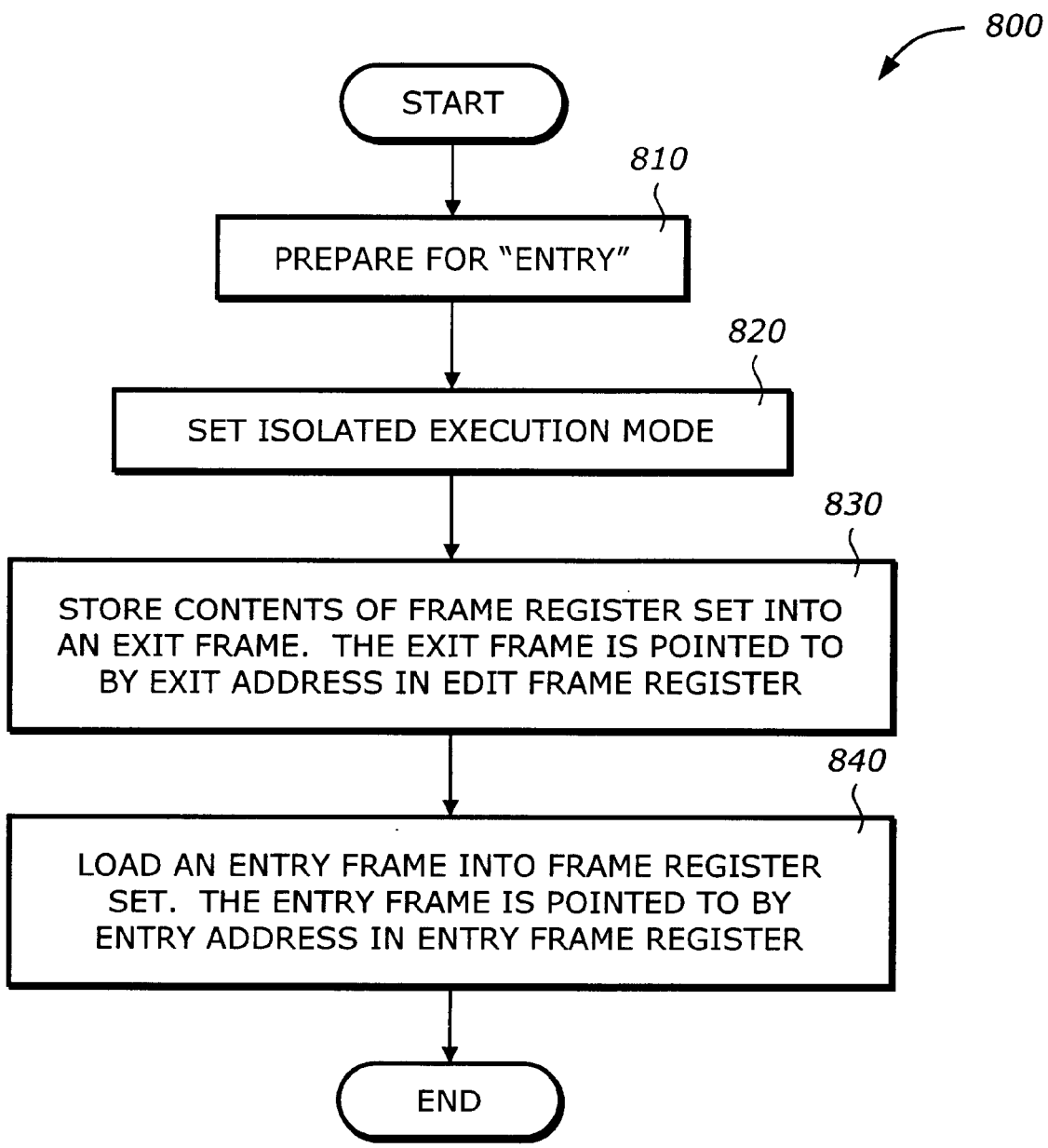
FIG. 8A is a flowchart illustrating a process to execute the iso_enter instruction according to one embodiment of the invention.

FIG. 8A is a flowchart illustrating a process 800 to execute the iso_enter instruction according to one embodiment of the invention.

Upon START, the process 800 prepares for entry (Block 810). The preparation may include verification of the frame address and saving the current control register and the IDTR limit. Then, the process 800 sets the isolated execution mode by configuring the execution mode word (Block 820). Next, the process 800 stores contents of the frame register set into an exit frame (Block 830). The exit frame is pointed to by the exit address in the exit frame register. Then, the process 800 loads an entry frame into the frame register set (Block 840). The entry frame is pointed to by the entry address in the entry frame register. Then, the process 800 is terminated.

Figure 8B:
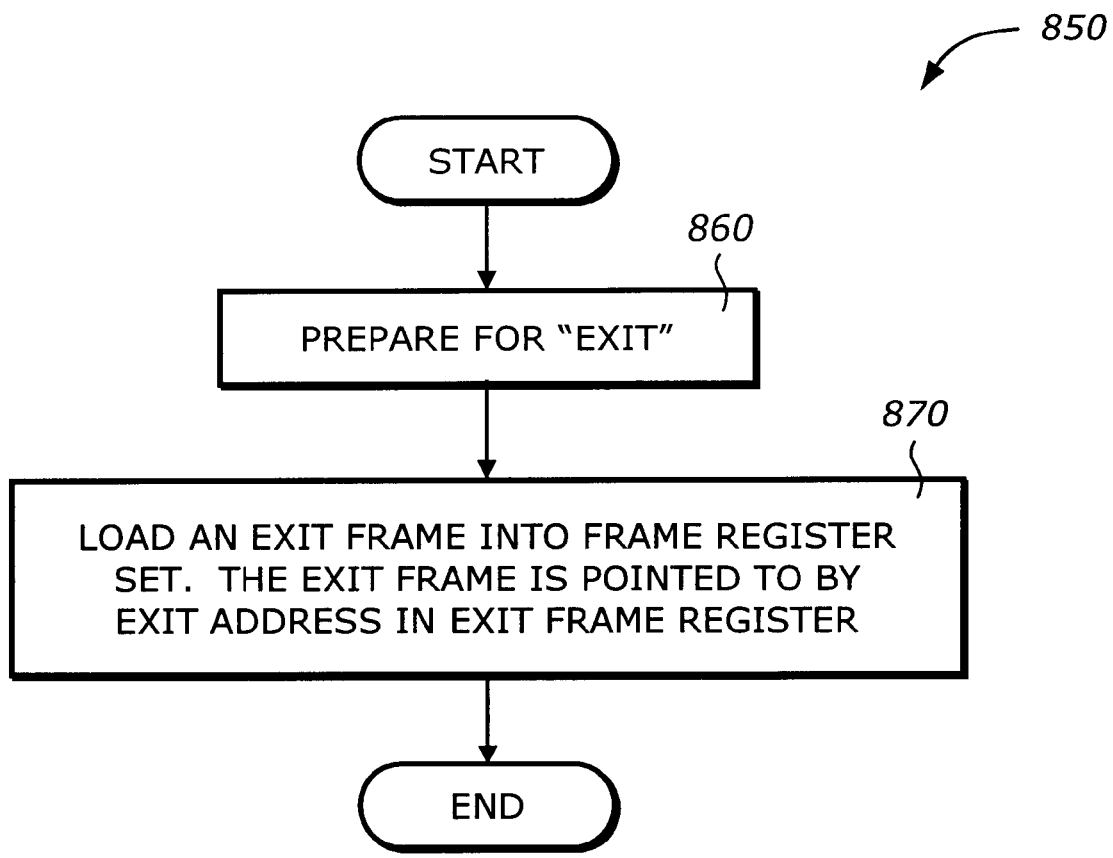
FIG. 8B is a flowchart illustrating a process to execute the iso_exit instruction according to one embodiment of the invention.

FIG. 8B is a flowchart illustrating a process 850 to execute the iso_exit instruction according to one embodiment of the invention.

Upon START, the process 850 prepares for exit (Block 860). The preparation may include verifying the frame address and clearing the IDTR limit to ensure proper dispatch to the correct handler if there is a machine check before restoring the frame. Then, the process 850 loads an exit frame into the frame register set (Block 870). The exit frame is pointed to by the exit address in the exit frame register. Then, the process 850 is terminated.

Figure 9A:
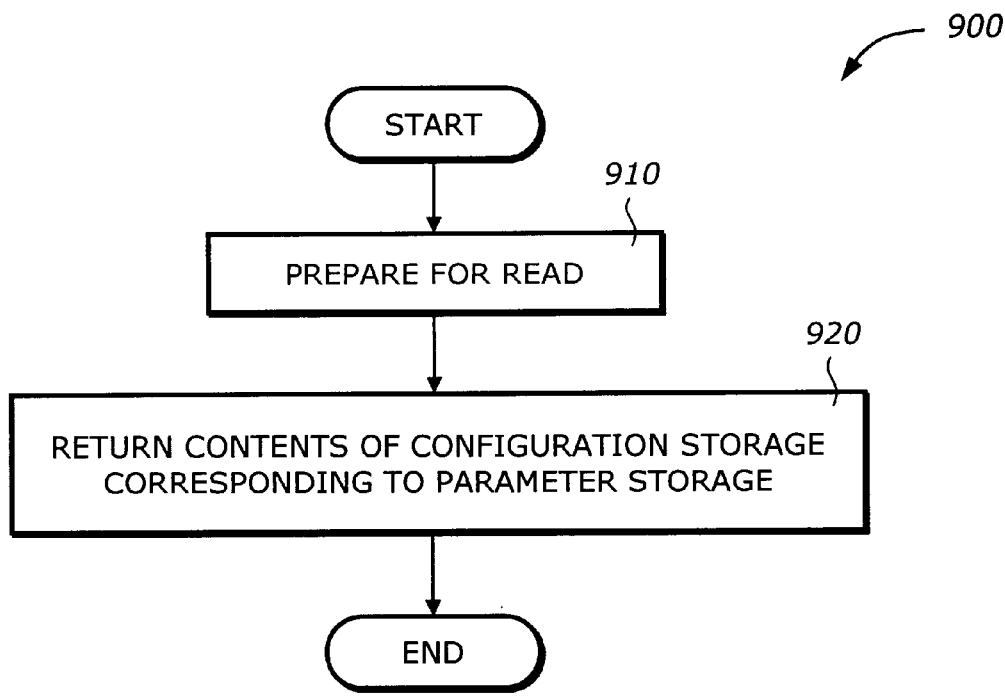
FIG. 9A is a flowchart illustrating a process to execute the iso_config_read instruction according to one embodiment of the invention.

FIG. 9A is a flowchart illustrating a process 900 to execute the iso_config_read instruction according to one embodiment of the invention.

Upon START, the process 900 prepares for reading the configuration storage (Block 910). The preparation may include verifying address of the configuration storage. Then, the process 900 returns the contents of the configuration storage corresponding to the parameter storage (Block 920). Then, the process 900 is terminated.

Figure 9B:
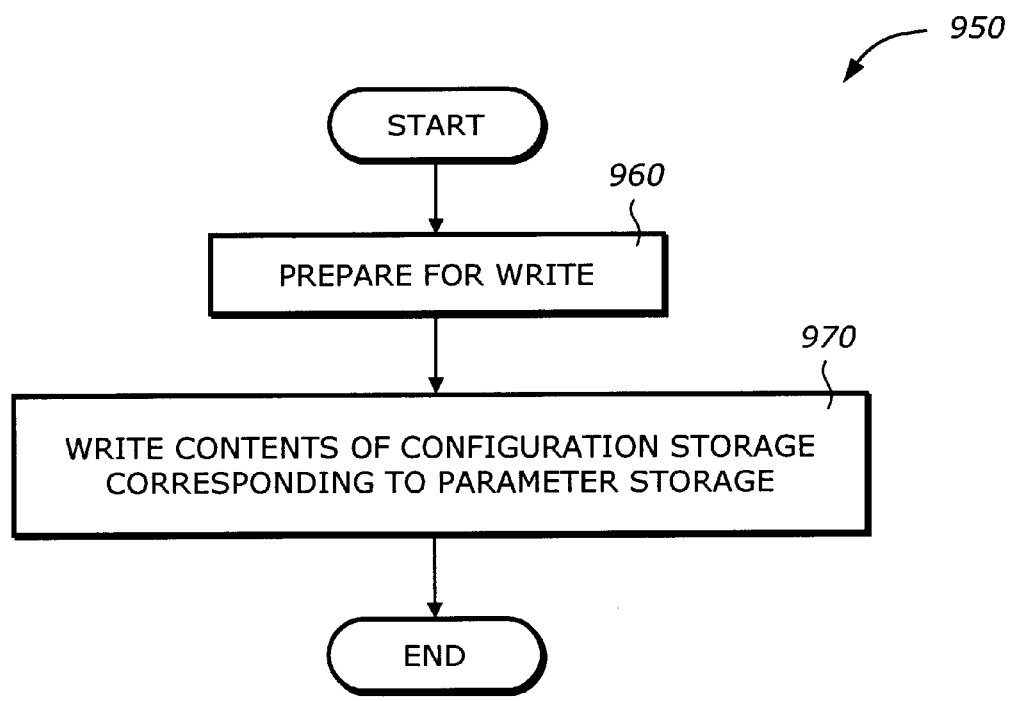
FIG. 9B is a flowchart illustrating a process to execute the iso_config_write instruction according to one embodiment of the invention.

FIG. 9B is a flowchart illustrating a process 950 to execute the iso_config_write instruction according to one embodiment of the invention.

Upon START, the process 950 prepares for writing to the configuration storage (Block 960). The preparation may include verifying address of the configuration storage. Then, the process 950 writes the contents of the configuration storage corresponding to the parameter storage (Block 970). Then, the process 950 is terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   an execution unit to execute an isolated instruction in a processor operating in a platform, the processor being configured in one of a normal execution mode and an isolated execution mode; and
   a parameter storage containing at least one parameter to support execution of the isolated instruction when the processor is configured in the isolated execution mode; wherein the isolated instruction is one of an isolated initialize (iso_init) instruction, an isolated close (iso_close) instruction, an isolated enter (iso_-enter) instruction, an isolated exit (iso_exit) instruction, an isolated configuration read (iso_config_read), and an isolated configuration write (iso_config_write) instruction.

2. The apparatus of claim 1 wherein the at least one parameter is one of an isolated feature word, an execution mode word, a logical processor value, an isolated setting including a mask value and a base value, a frame, an exit physical address, an entry physical address, and a processor nub loader physical address.

3. The apparatus of claim 2 wherein the parameter storage is one of an internal storage and an external storage.

4. The apparatus of claim 3 wherein the internal storage includes a feature register to store the isolated feature word, a control register to store the execution mode word, a logical processor register to store a logical processor value, a mask register to store the mask value, a base register to store the base value, a frame register set to store the frame, an exit frame register to store the exit address, an entry frame register to store the entry address, and a loader register to store the processor nub loader address.

5. The apparatus of claim 4 wherein the external storage includes a memory controller hub (MCH) storage in an MCH and an input/output controller hub (ICH) storage in an ICH.

6. The apparatus of claim 5 wherein the execution mode word configures the processor in the isolated execution mode.

7. The apparatus of claim 6 wherein the iso_init instruction, when executed, causes the processor to:
   create an isolated area in a memory if the isolated area has not been created, the isolated area being defined by the base value and the mask value;
   set a range of the isolated area in the MCH storage;
   copy a processor nub loader into the isolated area using the processor nub loader address in the loader register; and
   execute the processor nub loader.

8. The apparatus of claim 7 wherein the iso_init instruction, when executed, further causes the processor to:
   initialize the isolated area for the platform; and
   obtain a location of a processor nub.

9. The apparatus of claim 8 wherein the iso_init instruction causing the processor to execute the processor nub loader causes the processor to:
   copy the processor nub into the isolated area; and
   verify a signature of the processor nub using a public key contained in the processor nub loader; and
   execute the processor nub if the signature is verified.

10. The apparatus of claim 6 wherein the iso_close instruction, when executed, causes the processor to:
    reset the isolated setting in the processor if a corresponding logical processor is last to withdraw; and
    reset the isolated setting in the MCH and the ICH if the processor is last to withdraw.

11. The apparatus of claim 6 wherein the iso_enter instruction, when executed, causes the processor to:
    store contents of the frame register set in an exit frame, the exit frame being pointed to by the exit address in the exit frame register; and load an entry frame into the frame register set, the entry frame being pointed to by the entry address in the entry frame register.

12. The apparatus of claim 6 wherein the iso_exit instruction, when executed, causes the processor to:
load an exit frame into the frame register set, the exit frame being pointed to by the exit address in the exit frame register.

13. The apparatus of claim 6 wherein the iso_config_read instruction, when executed, causes the processor to:
return contents of a configuration storage corresponding to the parameter storage.

14. The apparatus of claim 6 wherein the iso_config_write instruction, when executed, causes the processor to:
write contents of a configuration storage corresponding to the parameter storage.

15. A method comprising:
executing an isolated instruction by an execution unit in a processor operating in a platform, the processor being configured in one of a normal execution mode and an isolated execution mode; and
supporting execution of the isolated instruction by a parameter storage containing at least one parameter when the processor is configured in the isolated execution mode;
wherein executing the isolated instruction comprises executing one of an isolated initialize (iso_init) instruction, an isolated close (iso_close) instruction, an isolated enter (iso_enter) instruction, an isolated exit (iso_exit) instruction, an isolated configuration read (iso_config_read), and an isolated configuration write (iso_config_write) instruction.

16. The method of claim 15 wherein the at least one parameter is one of an isolated feature word, an execution mode word, a logical processor value, an isolated setting including a mask value and a base value, a frame, an exit physical address, an entry physical address, and a processor nub loader physical address.

17. The method of claim 16 wherein the parameter storage is one of an internal storage and an external storage.

18. The method of claim 17 wherein the internal storage includes a feature register to store the isolated feature word, a control register to store the execution mode word, a logical processor register to store a logical processor value, a mask register to store the mask value, a base register to store the base value, a frame register set to store the frame, an exit frame register to store the exit address, an entry frame register to store the entry address, and a loader register to store the processor nub loader address.

19. The method of claim 18 wherein the external storage includes a memory controller hub (MCH) storage in an MCH and an input/output controller hub (ICH) storage in an ICH.

20. The method of claim 19 wherein the execution mode word configures the processor in the isolated execution mode.

21. The method of claim 20 wherein executing the iso_init instruction comprises:
creating an isolated area in a memory if the isolated area has not been created, the isolated area being defined by the base value and the mask value;
setting a range of the isolated area in the MCH storage;
copying a processor nub loader into the isolated area using the processor nub loader address in the loader register; and
executing the processor nub loader.

22. The method of claim 21 wherein executing the iso_init instruction further comprises:
initializing the isolated area for the platform; and
obtaining a location of a processor nub.

23. The method of claim 22 wherein executing the processor nub loader comprises:
copying the processor nub into the isolated area;
verifying a signature of the processor nub using a public key contained in the processor nub loader; and
executing the processor nub if the signature is verified.

24. The method of claim 20 wherein executing the iso_close instruction comprises:
resetting the isolated setting in the processor if a corresponding logical processor is last to withdraw; and
resetting the isolated setting in the MCH and the ICH if the processor is last to withdraw.

25. The method of claim 20 wherein executing the iso_enter instruction comprises:
storing contents of the frame register set in an exit frame, the exit frame being pointed to by the exit address in the exit frame register; and
loading an entry frame into the frame register set, the entry frame being pointed to by the entry address in the entry frame register.

26. The method of claim 20 wherein executing the iso_exit instruction comprises:
loading an exit frame into the frame register set, the exit frame being pointed to by the exit address in the exit frame register.

27. The method of claim 20 wherein executing the iso_config_read instruction comprises:
returning contents of a configuration storage corresponding to the parameter storage.

28. The method of claim 20 wherein executing the iso_config_write instruction comprises:
writing contents of a configuration storage corresponding to the parameter storage.

29. A system comprising:
a chipset;
a memory coupled to the chipset having an isolated memory area; and
a processor coupled to the chipset and the memory operating in a platform, the processor having an isolated instruction execution circuit, the processor being configured in one of a normal execution mode and an isolated execution mode, the isolated instruction execution circuit comprising:
an execution unit to execute an isolated instruction, and
a parameter storage containing at least one parameter to support execution of the isolated instruction when the processor is configured in the isolated execution mode; wherein the isolated instruction is one of an isolated initialize (iso_init) instruction, an isolated close (iso_close) instruction, an isolated enter (iso_enter) instruction, an isolated exit (iso_exit) instruction, an isolated configuration read (iso_config_read), and an isolated configuration write (iso_config_write) instruction.

30. The system of claim 29 wherein the at least one parameter is one of an isolated feature word, an execution mode word, a logical processor value, an isolated setting including a mask value and a base value, a frame, an exit physical address, an entry physical address, and a processor nub loader physical address.

31. The system of claim 30 wherein the parameter storage is one of an internal storage and an external storage.

32. The system of claim 31 wherein the internal storage includes a feature register to store the isolated feature word, a control register to store the execution mode word, a logical processor register to store the logical processor value, a mask register to store the mask value, a base register to store the base value, a frame register set to store the frame, an exit frame register to store the exit address, an entry frame register to store the entry address, and a loader register to store the processor nub loader address.

33. The system of claim 32 wherein the external storage includes a memory controller hub (MCH) storage in an MCH and an input/output controller hub (ICH) storage in an ICH.

34. The system of claim 33 wherein the execution mode word configures the processor in the isolated execution mode.

35. The system of claim 34 wherein the iso_init instruction, when executed, causes the processor to:

create an isolated area in a memory if the isolated area has not been created, the isolated area being defined by the base value and the mask value;

set a range of the isolated area in the MCH storage;

copy a processor nub loader into the isolated area using the processor nub loader address in the loader register; and execute the processor nub loader.

36. The system of claim 35 wherein the iso_init instruction, when executed, further causes the processor to:

initialize the isolated area for the platform; and obtain a location of a processor nub.

37. The system of claim 36 wherein the iso_init instruction causing the processor to execute the processor nub loader causes the processor to:

copy the processor nub into the isolated area; and verify a signature of the processor nub using a public key contained in the processor nub loader; and execute the processor nub if the signature is verified.

38. The system of claim 34 wherein the iso_close instruction, when executed, causes the processor to:

reset the isolated setting in the processor if a corresponding logical processor is last to withdraw; and reset the isolated setting in the MCH and the ICH if the processor is last to withdraw.

39. The system of claim 34 wherein the iso_enter instruction, when executed, causes the processor to:

store contents of the frame register set in an exit frame, the exit frame being pointed to by the exit address in the exit frame register; and load an entry frame into the frame register set, the entry frame being pointed to by the entry address in the entry frame register.

40. The system of claim 34 wherein the iso_exit instruction, when executed, causes the processor to:

load an exit frame into the frame register set, the exit frame being pointed to by the exit address in the exit frame register.

41. The system of claim 34 wherein the iso_config_read instruction, when executed, causes the processor to:

return contents of a configuration storage corresponding to the parameter storage.

42. The system of claim 34 wherein the iso_config_write instruction, when executed, causes the processor to:

write contents of a configuration storage corresponding to the parameter storage.

43. A computer program product comprising:

a machine readable medium having computer program code embodied therein, the computer program product having:

computer readable program code for executing an isolated instruction by an execution unit in a processor operating in a platform, the processor being configured in one of a normal execution mode and an isolated execution mode; and computer readable program code for supporting execution of the isolated instruction by a parameter storage containing at least one parameter when the processor is configured in the isolated execution mode; wherein the computer readable program code for executing the isolated instruction comprises computer readable program code for executing one of an isolated initialize (iso_init) instruction, an isolated close (iso_close) instruction, an isolated enter (iso_enter) instruction, an isolated exit (iso_exit) instruction, an isolated configuration read (iso_config_read), and an isolated configuration write (iso_config_write) instruction.

44. The computer program product of claim 43 wherein the at least one parameter is one of an isolated feature word, an execution mode word, a logical processor value, an isolated setting including a mask value and a base value, a frame, an exit physical address, an entry physical address, and a processor nub loader physical address.

45. The computer program product of claim 44 wherein the parameter storage is one of an internal storage and an external storage.

46. The computer program product of claim 45 wherein the internal storage includes a feature register to store the isolated feature word, a control register to store the execution mode word, a logical processor register to store a logical processor value, a mask register to store the mask value, a base register to store the base value, a frame register set to store the frame, an exit frame register to store the exit address, an entry frame register to store the entry address, and a loader register to store the processor nub loader address.

47. The computer program product of claim 46 wherein the external storage includes a memory controller hub (MCH) storage in an MCH and an input/output controller hub (ICH) storage in an ICH.

48. The computer program product of claim 47 wherein the execution mode word configures the processor in the isolated execution mode.

49. The computer program product of claim 48 wherein the computer readable program code for executing the iso_init instruction comprises:

computer readable program code for creating an isolated area in a memory if the isolated area has not been created, the isolated area being defined by the base value and the mask value;

computer readable program code for setting a range of the isolated area in the MCH storage;

computer readable program code for copying a processor nub loader into the isolated area using the processor nub loader address in the loader register; and computer readable program code for executing the processor nub loader.

50. The computer program product of claim 49 wherein the computer readable program code for executing the iso_init instruction further comprises:

computer readable program code for initializing the isolated area for the platform; and computer readable program code for obtaining a location of a processor nub.

51. The computer program product of claim 50 wherein the computer readable program code for executing the processor nub loader comprises:

computer readable program code for copying the processor nub into the isolated area;

computer readable program code for verifying a signature of the processor nub using a public key contained in the processor nub loader; and computer readable program code for executing the processor nub if the signature is verified.

52. The computer program product of claim 48 wherein the computer readable program code for executing the iso_close instruction comprises:

computer readable program code for resetting the isolated setting in the processor if a corresponding logical processor is last to withdraw; and computer readable program code for resetting the isolated setting in the MCH and the ICH if the processor is last to withdraw.

53. The computer program product of claim 48 wherein the computer readable program code for executing the iso_enter instruction comprises:

computer readable program code for storing contents of the frame register set in an exit frame, the exit frame being pointed to by the exit address in the exit frame register; and computer readable program code for loading an entry frame into the frame register set, the entry frame being pointed to by the entry address in the entry frame register.

54. The computer program product of claim 48 wherein the computer readable program code for executing the iso_exit instruction comprises:

computer readable program code for loading an exit frame into the frame register set, the exit frame being pointed to by the exit address in the exit frame register.

55. The computer program product of claim 48 wherein the computer readable program code for executing the iso_config_read instruction comprises:

computer readable program code for returning contents of a configuration storage corresponding to the parameter storage.

56. The computer program product of claim 48 wherein the computer readable program code for executing the iso_config_write instruction comprises:

computer readable program code for writing contents of a configuration storage corresponding to the parameter storage.

\* \* \* \* \*

UNITED STATES PATENT AND TRADEMARK OFFICE
CERTIFICATE OF CORRECTION

PATENT NO.     : 6,507,904 B1
DATED          : January 14, 2003
INVENTOR(S)    : Ellison et al.

It is certified that error appears in the above-identified patent and that said Letters Patent is hereby corrected as shown below:

Column 1,
Line 16, delete "modem" and insert -- modern --.

Signed and Sealed this

Eighth Day of April, 2003

JAMES E. ROGAN
*Director of the United States Patent and Trademark Office*